April 7, 1964 J. A. COOK 3,128,023
FISHING LINE CUTTER
Filed Nov. 9, 1962
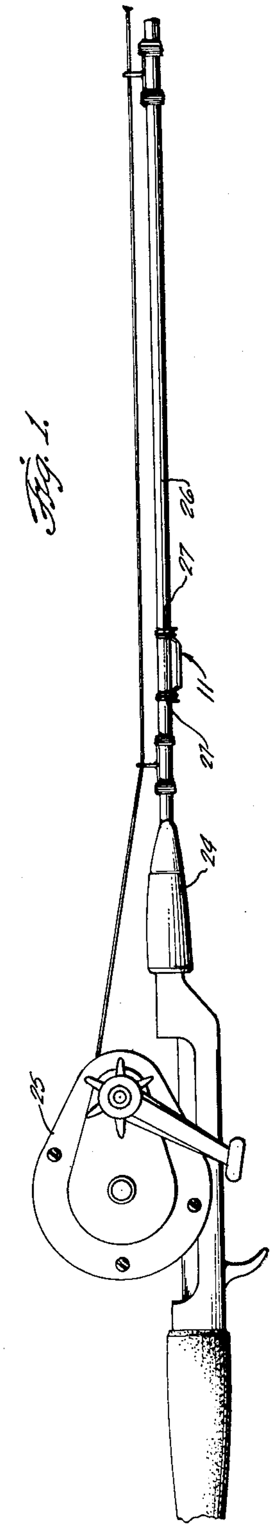
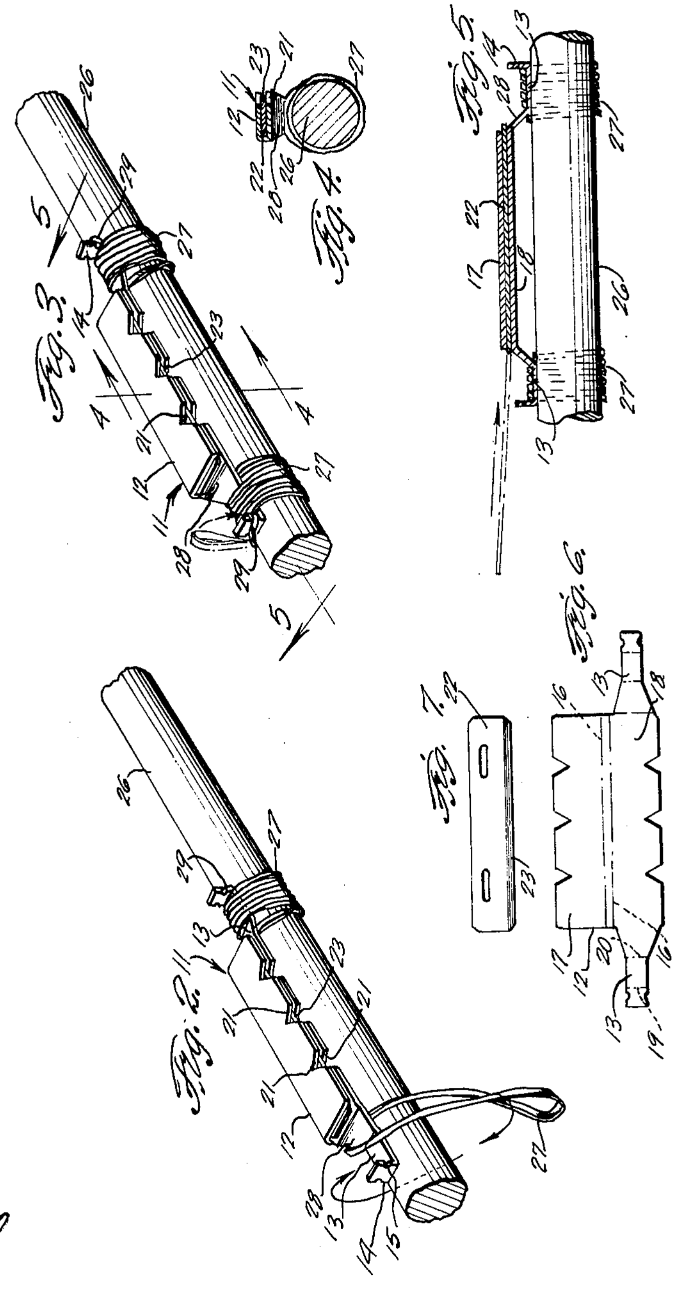
INVENTOR.
JAMES A. COOK
BY
McMorrow, Berman + Davidson
ATTORNEYS United States Patent Office 3,128,023

Patented Apr. 7, 1964

1

3,128,023
FISHING LINE CUTTER

James A. Cook, El Monte, Calif.
(213 Burress, Houston, Tex.)

Filed Nov. 9, 1962, Ser. No. 236,553
5 Claims. (Cl. 225—19)

This invention relates to fishing implements, and more particularly to a line cutting attachment adapted to be mounted on a fishing rod.

A main object of the invention is to provide an improved fishing line cutter which may be employed for cutting fishing line, leader lines, or the like, adapted to be mounted on a fishing rod, the device being simple in construction, being easy to install and being safe to handle.

A further object of the invention is to provide an improved fishing line cutting attachment adapted to be mounted on a fishing rod and serving as a means for cutting all types of fishing line, as required, the device being inexpensive to manufacture, being compact in size, being easy to attach to a fishing rod or to remove therefrom, being arranged so that its cutting element is readily replaceable, and providing a convenient and readily accessible cutting means for changing fishing lines, attaching flies, swivels, hooks, and leaders.

Further objects and advantages of the invention will become apparent from the following description and claims, and from the accompanying drawings, wherein:

FIGURE 1 is a fragmentary side elevational view of a portion of a fishing rod provided with an improved fishing line cutting attachment constructed in accordance with the present invention.

FIGURE 2 is an enlarged fragmentary perspective view of a portion of the fishing rod of FIGURE 1, showing the attachment thereon and illustrating the manner of securement of the attachment to the fishing rod.

FIGURE 3 is a fragmentary perspective view, similar to FIGURE 2, and showing the attachment completely secured on the fishing rod and ready for use.

FIGURE 4 is a transverse vertical cross sectional view taken substantially on the line 4—4 of FIGURE 3.

FIGURE 5 is a longitudinal vertical cross sectional view taken substantially on the line 5—5 of FIGURE 3.

FIGURE 6 is a top plan view of the blank employed to fabricate the sleeve-like main body of the attachment.

FIGURE 7 is a side elevational view of a cutting blade adapted to be installed in the sleeve-like main body of the attachment.

Referring to the drawings, 11 generally designates a fishing line cutting attachment constructed in accordance with the present invention. The attachment 11 comprises an elongated flat sleeve-like body 12 which is of generally U-shaped cross section, open at one side, the body being formed with the oppositely extending downwardly offset end lugs 13, 13 projecting from the opposite ends thereof. The lugs 13, 13 are formed at their outer ends with the upstanding projections 14, said projections being provided at their opposite side edges with notches 15.

As shown in FIGURE 6, the body 12 may be formed from a flat blank of sheet metal which is folded at the longitudinal parallel fold lines 16, 16 to define a flat sleeve-like body of U-shaped cross section, as above described. Thus, in folding the blank on the parallel longitudinally extending fold lines 16, 16, a pair of side arms 17 and 18 will be defined which will be ultimately parallel. The side arm 18 is provided with the longitudinally extending end lugs 13, 13 located at its opposite ends, the end lugs being folded at the fold lines 19 to define the upstanding projections 14 and being also folded at the lines 20 to define the downwardly offset main lug portions adapted to engage the surface of a fishing rod, as will be presently described.

2

The adjacent free edges of the top and bottom arms 17 and 18 are formed with a plurality of V-shaped notches 21, the notches 21 of the respective arm edges being vertically aligned, as is clearly indicated in FIGURES 2 and 3. Received within the flat, sleeve-like U-shaped elongated main body 12 is a conventional razor blade 22 provided with the sharp cutting edge 23 at one longitudinal side edge thereof. The blade 22 is slidably receivable in the main body and is frictionally held therein by the resilient inward force exerted on the blade by the top arm 17 of the body, which clamps the blade resiliently against the bottom arm 18. As shown in FIGURE 2, the blade 22 is engageable in the sleeve-like main body and is of sufficient width so that portions of its cutting edge 23 are exposed through the vertically aligned pairs of notches 21, 21.

The attachment is preferably mounted on a fishing rod at a location from 1 to 3 inches from the rod handle, shown at 24 in FIGURE 1, and in a position wherein the sleeve-like main body is disposed diametrically opposite the reel 25 associated with the rod, as shown in FIGURE 1. The attachment is mounted by engaging the lugs 13, 13 on the rod, shown at 26, and securing the lugs to the rod by means of any suitable fastening means, such as a pair of rubber bands 27, 27 engaging around the lugs 13 and the fishing rod and suitably anchored, for example, as shown in FIGURE 2, by being looped at one end around an inclined portion 28 of the associated lug 13, and being looped at its other end around the upstanding projection 14 of the associated lug after being wound several times in the direction of the arrows in FIGURE 2 around the rod and lug. Thus, with the rubber bands engaged around the portions 28, the device is placed in contact with the fishing rod, after which each rubber band 27 is looped several times around the rod and the associated lug 13 in the manner above described and is then anchored by engaging the residual loop portion thereof on the upstanding projection 14 of the associated lug, as is illustrated at 29 in FIGURE 3.

When the device is thus mounted, the cutting edge 23 is exposed through the vertically aligned notches 21, 21 and is readily accessible for cutting a fishing line or other elongated object to be cut, such as a leader line, or the like.

To replace the blade 22, it is merely necessary to push a new blade into the sleeve-like main body 12 from one end thereof, thus ejecting the old blade from the other end of said sleeve-like body.

The elongated main body of the device may be made of any suitable material, such as sheet metal, plastic, or the like. Instead of employing a folded blank, the device may comprise a mass of molded material in which the cutting blade is embedded, with notches being molded at the side edges of the body to expose portions of the blade having sharp cutting edges. Alternatively, the cutting edges may be integrally molded in the plastic material.

While a specific embodiment of an improved fishing line cutter has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A fishing line cutter comprising an elongated flat body formed at one side edge with a notch, a blade secured to said body and having a sharp cutting edge exposed at said notch, and respective offset lugs projecting from the opposite ends of said body, whereby the body is adapted to be engaged lengthwise on a fishing rod and secured in offset parallel relation thereto by fastening said lugs to the rod.

2. A fishing line cutter comprising an elongated flat body formed at one side edge with at least one generally V-shaped notch, a blade secured to said body and having a sharp cutting edge exposed at said notch, respective offset lugs projecting from the opposite ends of said body, and respective elastic bands engageable around a fishing rod and adapted to engage said lugs and secure the body lengthwise on the rod in offset parallel relation thereto.

3. A fishing line cutter comprising an elongated flat sleeve-like body open at one side edge, said side edge being formed with at least one V-shaped notch, a blade secured in said body and having a sharp cutting edge exposed at said notch, and respective offset lugs projecting from the opposite ends of said body, whereby the body is adapted to be engaged lengthwise on a fishing rod and secured in offset parallel relation thereto by fastening said lugs to the rod.

4. A fishing line cutter comprising an elongated flat sleeve-like body open at one side edge, said side edge being formed with at least one V-shaped notch, a blade secured in said body and having a sharp cutting edge exposed at said notch, and respective offset lugs projecting longitudinally from the opposite ends of said body and having upstanding retaining projections at their ends, whereby the body is adapted to be engaged lengthwise on a fishing rod and secured in parallel offset relation thereto by fastening said lugs to the rod.

5. A fishing line cutter comprising an elongated flat sleeve-like body open at one side edge, said side edge being formed with at least one V-shaped notch, a blade secured in said body and having a sharp cutting edge exposed at said notch, respective offset lugs projecting longitudinally from the opposite ends of the body and having upstanding retaining projections at their ends, and respective elastic bands engageable around a fishing rod and adapted to engage said lugs and to secure the body lengthwise on the rod in parallel offset relation thereto.

References Cited in the file of this patent

UNITED STATES PATENTS

| | | |
|---|---|---|
| 1,784,258 | Tynan | Dec. 9, 1930 |
| 1,851,370 | Munger | Mar. 29, 1932 |
| 2,220,395 | Carter | Nov. 5, 1940 |
| 2,557,371 | Carlin | June 19, 1951 |
| 2,806,660 | Marcoff | Sept. 17, 1957 |
| 3,038,403 | Orelind | June 12, 1962 |

FOREIGN PATENTS

| | | |
|---|---|---|
| 7,725 | Great Britain | 1897 |
| 15,167 | Great Britain | 1906 |
| 603,290 | France | Jan. 8, 1926 |